United States Patent
Langensiepen et al.

(10) Patent No.: US 10,144,667 B2
(45) Date of Patent: Dec. 4, 2018

(54) DOWNSTREAM ROLLS FOR GLASS MANUFACTURE AND METHODS

(75) Inventors: Ralph Alfred Langensiepen, Corning, NY (US); Yanxia Ann Lu, Painted Post, NY (US); Weiguo Miao, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 728 days.

(21) Appl. No.: 13/605,439

(22) Filed: Sep. 6, 2012

(65) Prior Publication Data

US 2014/0060116 A1   Mar. 6, 2014

(51) Int. Cl.
  *C03B 35/18* (2006.01)
  *C03B 17/06* (2006.01)
(52) U.S. Cl.
  CPC .......... *C03B 17/064* (2013.01); *C03B 17/068* (2013.01); *C03B 35/181* (2013.01)
(58) Field of Classification Search
  CPC .................................................... C03B 35/181
  See application file for complete search history.

(56) References Cited

U.S. PATENT DOCUMENTS

| | | | |
|---|---|---|---|
| 3,763,533 A | 10/1973 | Blom et al. ................. 29/132 |
| 3,954,556 A | 5/1976 | Jackson et al. .............. 162/145 |
| 4,244,781 A | 1/1981 | Heckman ..................... 162/145 |
| 4,308,070 A | 12/1981 | Cavicchio ..................... 106/93 |
| 4,533,581 A | 8/1985 | Asaumi et al. ................. 428/64 |
| 5,118,544 A | 6/1992 | Delvaux et al. .............. 428/345 |
| 5,205,398 A | 4/1993 | Hart et al. .................... 198/780 |
| 5,378,219 A * | 1/1995 | Hart et al. ..................... 492/48 |
| 6,896,646 B2 | 5/2005 | Kaiser et al. .................. 492/40 |
| 7,284,328 B2 | 10/2007 | Kaiser ........................ 29/895.21 |
| 7,507,194 B2 | 3/2009 | Neubauer et al. ............. 492/40 |
| 7,842,632 B2 | 11/2010 | Neubauer et al. ........... 501/95.1 |
| 2004/0192526 A1 | 9/2004 | Nakayama et al. ........... 492/40 |
| 2007/0042883 A1 | 2/2007 | Daily et al. .................... 492/40 |
| 2008/0120995 A1 | 5/2008 | Neubauer et al. ............. 65/33.7 |
| 2009/0149310 A1 | 6/2009 | Neubauer et al. ........... 501/95.2 |
| 2009/0272151 A1 | 11/2009 | Lacasse et al. ............ 65/374.13 |
| 2009/0293547 A1 | 12/2009 | Heighway ................... 65/370.1 |
| 2010/0064729 A1* | 3/2010 | Nakayama et al. ............. 65/90 |
| 2011/0023547 A1 | 2/2011 | Neubauer et al. ............... 65/90 |

\* cited by examiner

*Primary Examiner* — John M Hoffmann
(74) *Attorney, Agent, or Firm* — Thomas R. Beall; Ryan T. Hardee

(57) ABSTRACT

A downstream roll for glass manufacture comprises at least one millboard piece. At least a portion of an outer peripheral surface of the downstream roll comprises infiltrated ceramic particles. The infiltrated ceramic particles are infiltrated to a depth of about 1 mm to about 10 mm. Further examples of the disclosure include methods for manufacturing a glass ribbon and a downstream roll for glass manufacture.

7 Claims, 4 Drawing Sheets

DOWNSTREAM ROLLS FOR GLASS MANUFACTURE AND METHODS

TECHNICAL FIELD

The present invention relates generally to apparatus and methods for glass manufacture and, more particularly, to downstream rolls for glass manufacture and methods.

BACKGROUND

Glass manufacturing systems are commonly used to form various glass products such as LCD sheet glass. It is known to manufacture sheet glass by downwardly flowing molten glass over a forming wedge and drawing a glass ribbon from the root of the forming wedge. Pairs of downstream rolls are frequently provided to provide pulling forces to facilitate drawing of the glass ribbon from the forming device.

Downstream rolls are used in the manufacture of sheet glass. Downstream rolls are preferably designed to contact the glass ribbon at its outer edges, specifically, in regions just inboard of the thickened beads which exist at the very edges of the ribbon. Some examples of downstream rolls are pulling rolls, which are used to apply tension to the ribbon of glass from which the sheets are formed and thus control nominal sheet thickness.

A downstream roll needs to meet a number of criteria. First, the roll needs to be able to withstand the high temperatures associated with newly formed glass for extended periods of time. Second, the downstream roll must not give off excessive amounts of particles, which can adhere to the glass and form surface defects (known as "onclusions"). For glass that is to be used in such demanding applications as substrates for flat panel displays, onclusions must be kept to very low levels. Third, if a pulling roll, the downstream roll must be able to produce enough force to control the thickness of the glass ribbon. In order not to damage the central portion of the ribbon that becomes the usable finished glass, the roll can only contact the ribbon over a limited area at its edges. Thus, the required pulling forces must be generated using only this area while imparting minimal point loading stress. However, the forces cannot be too large since this can create surface damage which can propagate into the usable central portion of the ribbon or cause cracking of the glass ribbon. When cracking occurs, a great number of glass particles are generated which can damage and contaminate the roll materials. Therefore, the roll must also be hard enough to allow continuous operation while simultaneously soft enough to minimize the stresses resulting from cast off glass particles. Ideally, the roll is soft enough to allow these cast off particles to be driven into the roll in order to maintain the same contact stress on the ribbon.

The existing downstream rolls have not been able to fully satisfy these competing criteria of long life, controlled force application, low contamination and reduced penetration resistance. The present invention addresses these shortcomings in the art and provides improved downstream rolls that achieve higher levels of performance than existing downstream rolls.

SUMMARY

The following presents a simplified summary of the disclosure in order to provide a basic understanding of some example aspects described in the detailed description.

In one example aspect of the disclosure, a downstream roll for glass manufacture comprises at least one millboard piece. At least a portion of an outer peripheral surface of the downstream roll comprises infiltrated ceramic particles. The infiltrated ceramic particles are infiltrated to a depth of about 1 mm to about 10 mm.

In one example of the aspect, the infiltrated ceramic particles are infiltrated to a depth of about 1 mm to about 2 mm.

In another example of the aspect, the infiltrated ceramic particles are selected from the group consisting of $SiO_2$, $ZrO_2$, $Al_2O_3$ and their precursors thereof.

In still another example of the aspect, the non-infiltrated portion of the roll has a compressed density of less than about 0.97 g/cc.

In a further example of the aspect, the non-infiltrated portion of the roll has a compressed density in the range of about 0.85 g/cc to about 0.95 g/cc.

In a further example of the aspect, the infiltrated outer peripheral surface has a Shore D hardness greater than about 45 and the non-infiltrated portion has a Shore D hardness of less than about 41.

In still a further example of the aspect, the roll has a spring constant of less than about 4450 N/mm.

In still another example of the aspect, the at least one millboard piece comprises a plurality of discs.

In a further example of the aspect, the at least one millboard piece comprises a monolithic roll.

In another example aspect of the disclosure, a method for manufacturing glass ribbon comprises the step (I) of providing a forming apparatus. The forming apparatus is includes a forming member and at least one downstream roll. The downstream roll comprises at least one millboard piece. At least a portion of an outer peripheral surface of the downstream roll comprises infiltrated ceramic particles. The infiltrated ceramic particles are infiltrated to a depth of about 1 mm to about 10 mm. The method further includes the step (II) of forming the glass ribbon with the forming member. The method still further includes the step (III) of engaging a first edge portion of the glass ribbon with the at least one downstream roll.

In one example of the aspect, step (II) includes forming the glass ribbon by fusion down-drawing glass from the forming member.

In another example of the aspect, step (III) includes driving the at least one downstream roll to pull the edge portion of the glass ribbon from the forming member.

In yet another example of the aspect, step (I) further provides the forming apparatus with an additional downstream roll comprising at least one millboard piece. At least a portion of an outer peripheral surface of the downstream roll comprises infiltrated ceramic particles. The infiltrated ceramic particles are infiltrated to a depth of about 1 mm to about 10 mm. Furthermore, step (III) includes engaging a second edge portion of the glass ribbon with the additional downstream roll.

In still another example aspect of the disclosure, a method of manufacturing a downstream roll comprises the step (I) of providing at least one millboard piece and the step (II) of compressing the at least one millboard piece. The method further includes the step (III) of contacting an outer peripheral surface of the at least one millboard piece with a source ceramic precursor such that the outer peripheral surface is infiltrated with ceramic particles to a depth of about 1 mm to about 10 mm. The method also includes the step (IV) of drying the at least one millboard piece.

In one example of the aspect, steps (III) and (IV) are conducted after step (II).

In another example of the aspect, steps (III) and (IV) are conducted before step (II).

In yet another example of the aspect, the source ceramic precursor is selected from the group consisting of a silica based nano binder solution, an alumina sol solution, and a zirconia acetate solution.

In still another example of the aspect, the source ceramic precursor comprises a liquid mixture including a concentration of about 5% to about 50% of solid ceramic material.

In a further example of the aspect, step (III) includes contacting the outer peripheral surface of the at least one millboard piece with a dip bath including the source ceramic precursor.

In yet another example of the aspect, step (III) includes contacting the outer peripheral surface of the at least one millboard piece with a transfer roll provided with the source ceramic precursor.

BRIEF DESCRIPTION OF THE DRAWINGS

These and other aspects are better understood when the following detailed description is read with reference to the accompanying drawings, in which.

DETAILED DESCRIPTION

Figure 1:
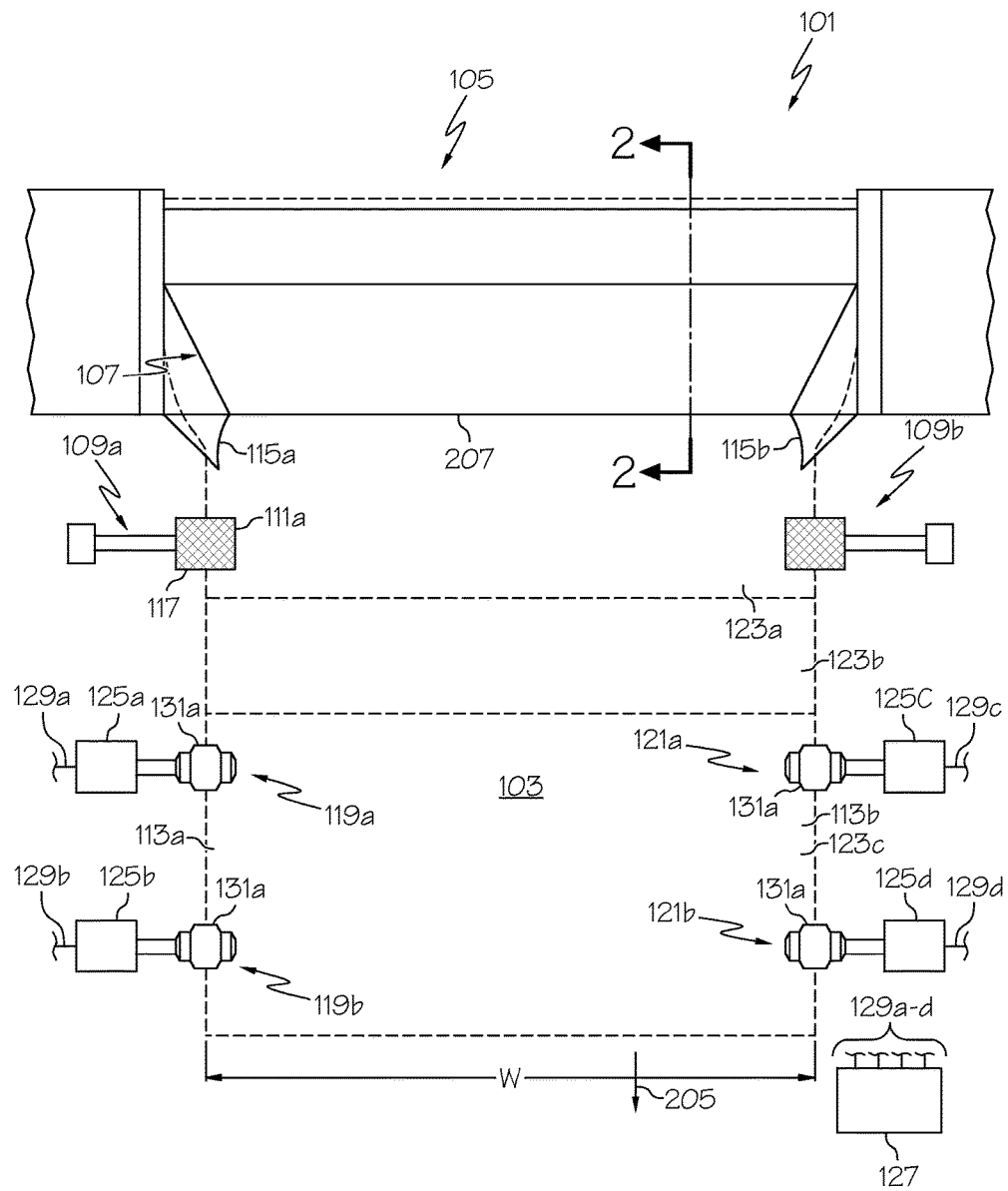
FIG. 1 is a schematic view of an apparatus for fusion drawing a glass ribbon.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Aspects of the present disclosure may be used to produce glass sheets that are commonly used, for example, in display applications, for example liquid crystal displays (LCDs), electrophoretic displays (EPD), organic light emitting diode displays (OLEDs), plasma display panels (PDPs), or the like. Glass sheets produced with aspects of the present disclosure may be obtained from a glass ribbon formed from a forming apparatus including a forming member and an edge roll. In some examples, the forming apparatus may be used to form the glass ribbon using various techniques such as slot draw, float, down-draw, fusion down-draw, fusion up-draw or other glass ribbon forming techniques. The glass ribbon may then be subsequently divided to provide glass sheets suitable for further processing into a desired display application.

FIG. 1 illustrates portions of an example forming apparatus comprising a fusion down-draw forming apparatus 101 for forming a glass ribbon 103. Although not shown, other configurations may be provided for a fusion down-draw forming process or other various alternative process techniques (e.g., slot draw, float, fusion up-draw) used to produce the glass ribbon 103.

Figure 2:
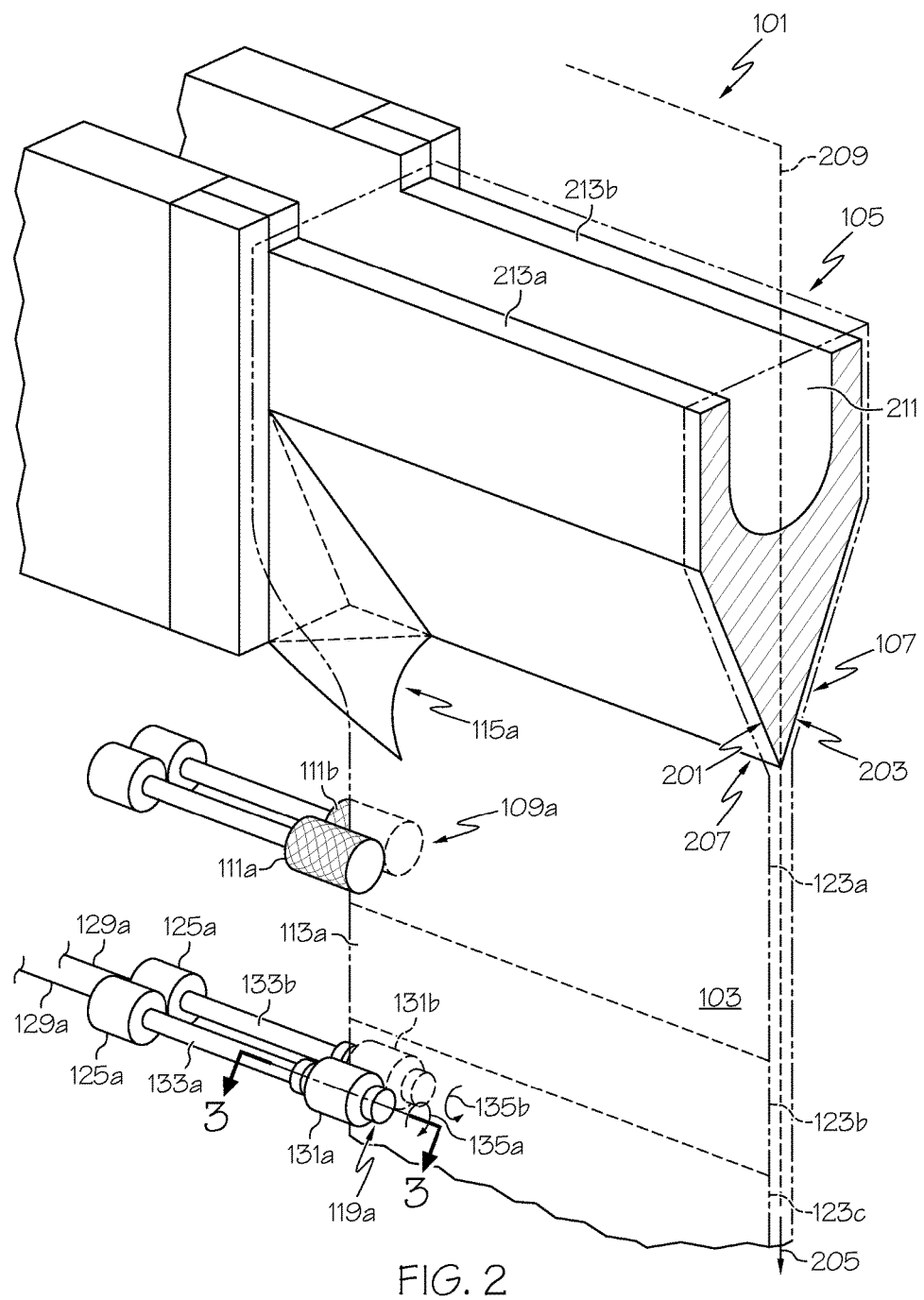
FIG. 2 is a cross sectional perspective view of the apparatus along line 2-2 of FIG. 1 illustrating portions of a first example apparatus.

In the illustrated example, the fusion down-draw forming apparatus 101 includes a forming member 105 comprising a forming wedge 107. As shown in FIG. 2, the forming wedge 107 includes a pair of downwardly inclined forming surface portions 201, 203 extending between opposed ends of the forming wedge 107. The pair of downwardly inclined forming surface portions 201, 203 converge along a downstream direction 205 to form a root 207. A draw plane 209 extends through the root 207 wherein the glass ribbon 103 may be drawn in the downstream direction 205 along the draw plane 219. As shown, the draw plane 209 can bisect the root 207 although the draw plane 209 may extend at other orientations with respect to the root 207.

Referring to FIG. 1, the fusion down-draw forming apparatus 101 can optionally include a pair of edge roller assemblies 109a, 109b that each include a pair of edge rolls 111a, 111b (see FIG. 2) configured to correspondingly engage first and second edge portions 113a, 113b of the glass ribbon 103 as the glass ribbon is drawn off the root 207 of the forming wedge 107. As shown, a width "W" of the glass ribbon 103 can extend perpendicular to the downstream direction 205, wherein the width "W" is defined between the first and second edge portion. The edge roller assemblies 109a, 109b facilitate proper finishing of the edge portions 113a, 113b of the glass ribbon 103. Edge roller finishing provides desired edge characteristics and proper fusion of the edge portions of the molten glass being pulled off opposed surfaces of edge directors 115a, 115b associated with the pair of downwardly inclined forming surface portions 201, 203. Each edge roll 111a, 111b can include a knurled surface 117 that can help finish the surfaces of the corresponding edge portions 113a, 113b.

The fusion down-draw forming apparatus 101 can also include at least one downstream roll apparatus 119a, 119b, 121a, 121b. Indeed, as shown in FIG. 1, the fusion down-draw forming apparatus 101 can include at least one downstream roll apparatus 119a, 119b for the first edge portion 113a and another downstream roll apparatus 121a, 121b for the second edge portion 113b. For instance, as shown in FIG. 1, the first edge portion 113a can be provided with two downstream roll apparatus 119a, 119b although a single or three or more downstream roll apparatus may be provided in further examples. As further shown in FIG. 1, the second edge portion 113b can likewise be provided with two downstream roll apparatus 121a, 121b although a single or three or more downstream roll apparatus may be provided in further examples.

In operation, during a fusion-down draw forming process, molten glass may be introduced, e.g., flow, into a trough 211 of forming member 105. The molten glass may then fill the trough (upper trough portion) and subsequently flow over a pair of weirs 213a, 213b of the forming member 105. The molten glass may then simultaneously flow over the pair of downwardly inclined forming surface portions 201, 203 comprising a forming wedge 107 (lower wedge portion). The method further includes drawing the molten glass from the root 207 of the forming wedge 107 to form the glass ribbon 103.

As shown in FIG. 1, the glass ribbon 103 can include a viscous zone 123a, an elastic zone 123c and a setting zone 123b between the viscous zone 123a and the elastic zone 123c. In the elastic zone, the glass ribbon 103 can be bent and manipulated without permanently changing the shape of the glass. In the viscous zone 123a, the molten glass ribbon 103 can be manipulated before transitioning with final shape and other glass sheet characteristic set into the glass ribbon 103 in the setting zone 123b.

As shown, the edge roller assemblies 109a, 109b can be provided to engage the edge portions 113a, 113b within the viscous zone 123a although the edge roller assemblies 109a, 109b may alternatively engage the edge portions 113a, 113b within the setting zone 123b.

The at least one downstream roll apparatus 119a, 119b, 121a, 121b can also be driven to rotate by respective motors 125a, 125b, 125c, 125d that are controlled by way of a controller 127 communicating with the respective motors by communication lines 129a, 129b, 129c, 129d. For example, with reference to FIG. 2, the motors 125a may rotate a pair of downstream rolls 131a, 131b by way of respective shafts 133a, 133b in opposite rotation directions 135a, 135b to draw the respective edge portion along the downstream direction 205. Each edge portion 113a, 113b may include a single downstream roll apparatus although, as shown, each edge portion 113a, 113b can include a plurality of downstream roll apparatus. Providing at least one downstream roll apparatus can help control tension within the glass ribbon 103 thereby controlling the thickness of the glass ribbon. Moreover, providing a plurality of downstream roll apparatus can help prevent disturbances from the glass ribbon (e.g., from downstream severing procedures) from propagating up the glass ribbon into the viscous zone 123a and/or the setting zone 123b. As shown, each downstream roll apparatus 119a, 119b, 121a, 121b can be positioned to engage the respective edge portion 113a, 113b of the glass ribbon 103 within the elastic zone 123c. In further example, one or more (e.g., all) of the downstream roll apparatus may be designed to engage the respective edge portion 113a, 113b of the glass ribbon 103 within the setting zone 123b.

Figure 3:
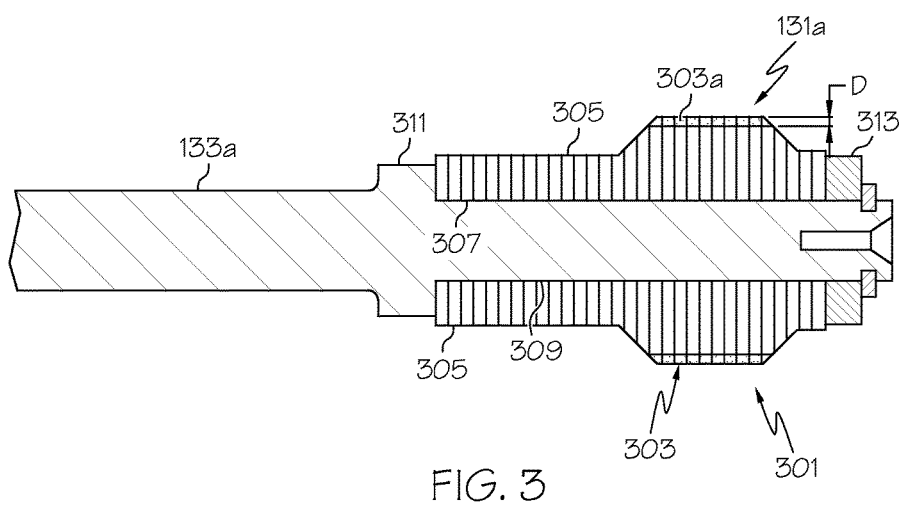
FIG. 3 is a cross sectional view of an example downstream pull roll in accordance with aspects of the disclosure along line 3-3 of FIG. 2.

FIG. 3 illustrates a cross-sectional view of a portion of the downstream pull roll apparatus 119a along line 3-3 of FIG. 2. The downstream roll apparatus 119a includes the downstream roll 131a comprising at least one millboard piece 301. The at least one millboard piece 301 can include an outer peripheral surface 303, such as a circular cylindrical surface configured to engage the corresponding edge portion of the glass ribbon during the forming process. As shown in FIG. 3, the at least one millboard piece 301 optionally comprises a plurality of discs 305 that each include a central aperture 307 configured to receive a mounting core portion 309 of a rotation shaft 133a. The rotation shaft can include a shoulder 311 and a collar 313 that may be locked relative to the mounting core portion 309 to mount the at least one millboard roll 131 with respect to the mounting core portion 309. The mounting core portion 309 can include a circular cylindrical shape configured to be received within a round central aperture 307 of the respective discs. In alternative examples, the mounting core portion 309 may include a triangular, rectangular or other locking shape configured to be received within a correspondingly shaped aperture of each disc. In such examples, the discs may be keyed onto the mounting core portion 309 and thereby rotationally locked on the mounting core portion 309. Although not required, in one example, the discs may be compressed between the shoulder 311 and the collar 313.

Figure 4:
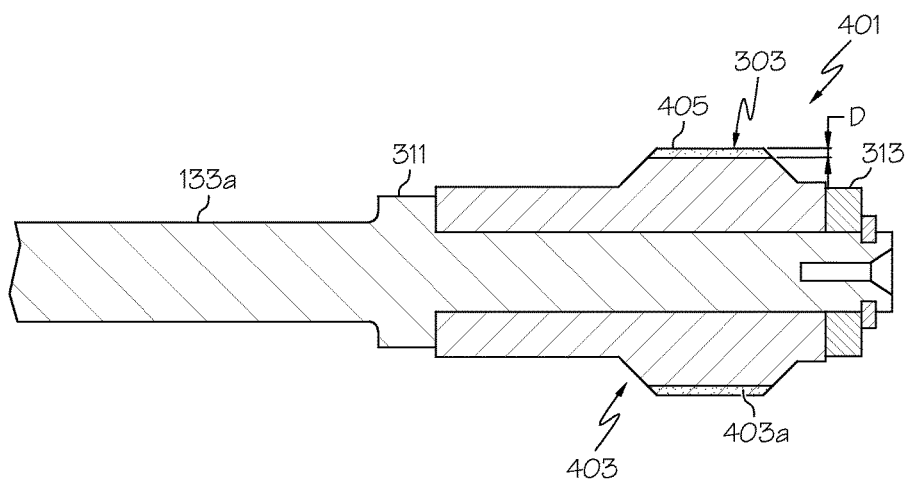
FIG. 4 is a cross sectional view of another example downstream pull roll in accordance with aspects of the disclosure along line 3-3 of FIG. 2.

FIG. 4 illustrates another example of a downstream roll apparatus 401 with similar or identical features discussed with respect to the downstream roll apparatus 119a discussed above. As shown, the downstream roll apparatus 401 can includes a downstream roll 403 with at least one millboard piece 405 that can comprise a monolithic roll. As shown, the downstream roll 403 can comprise a single millboard piece 405 formed as a single monolithic body. In further examples, the segment of the downstream roll 403 designed to contact the edge portion of the glass ribbon 103 can be formed as a monolithic piece while the remaining portions are formed as discs. Alternatively, the portion 403a may comprise a plurality of discs while the remaining portions can comprise monolithic portions.

As shown in FIGS. 3 and 4, at least a portion 303a, 403a of the outer peripheral surface 303 can be designed to contact the edge portions 113a, 113b of the glass ribbon 103 can be infiltrated with ceramic particles. As further illustrated, the at least a portion 303a, 403a of the outer peripheral surface 303 can be infiltrated with dilute concentrations of ceramic particles into the millboard to provide a hardened surface to counter wear conditions that may otherwise shorten the use life of downstream rolls, without the need for highly compressed millboard. Standard rolls are comprised of millboard containing mica, ceramic powder (fillers) and ceramic fibers, which is soft and loosely packed. In order to achieve the necessary hardness and wear resistance, standard rolls are tightly compressed during the assembly process, to a compressed density of about 1.09 g/cc. This compression serves the dual purposes of imparting hardness (standard rolls have a Shore D value of about 45 or greater) and attempts to minimize ceramic powder or fiber cast off. However, because the ceramic powder and fibers are still loosely bound to the roll, standard rolls still suffer from the problem of weakly bonded particles, which as discussed above, can result in undesirable onclusions. In addition, the hardness of the standard compressed roll helps the roll inhibit reception of particles into the body of the roll that may otherwise result in crack out of the glass ribbon during manufacturing processes.

In the downstream rolls of the present invention, the at least a portion 303a, 403a of the outer peripheral surface 303, 403 of the roll has been infiltrated with ceramic particles. Because roll life is to some extent dependent on surface wear rate, the property modification brought about by ceramic infiltration of the millboard can be provided through a depth, such as several mm deep, to remain effective for the life of the roll. However, in some examples, infiltration is not carried out throughout the entire body of the roll to avoid adverse reduction in compliance of the roll. In one example, the ceramic infiltrant is deposited to a controlled depth by adjusting the concentration and/or viscosity of the source ceramic precursor and its contact time with the millboard piece. According to one example, as shown in FIGS. 3 and 4, the infiltrated ceramic particles can be infiltrated to a depth "D" of about 1 mm to about 10 mm. In another example, the infiltrated ceramic particles can be infiltrated to a depth "D" of about 1 mm to about 2 mm. In addition or alternatively, the infiltration weight is about 1-5 wt % of the total downstream roll.

By infiltrating the roll with ceramic particles, the particles can harden and fill portions of the porous millboard rolls with fine ceramic particles to impart hardness. Therefore, the roll can be compressed to a lower compressed density as compared to a standard roll, wherein the compressed density of the infiltrated roll is less than about 0.97 g/cc, for example, in the range of about 0.85 g/cc to about 0.95 g/cc. The lower compressed density can be desirable to balance hardness and compliance; it affords a softer roll that may have an increased capability to accept tramp glass and other debris particles into the roll surface, thereby minimizing the contact stress that may otherwise develop between the glass ribbon and the cast off particles while maintaining the hardness necessary for wear resistance. In addition, because the ceramic particles are preferably infiltrated as a solution and/or suspension and/or emulsion in an inorganic binder, the presence of the inorganic binder also helps to bind the loosely bond particles of the standard roll more tightly than may be achieved with a simple compression, thereby minimizing powder or fiber cast off and onclusions generated from the roll itself.

Once the rolls are dried and the liquid carrier removed, the resulting roll can comprise a diffuse distribution of ceramic particles and binder which forms a bond with the roll constituent particles to harden and strengthen against wear, yet retains the lower spring constant of the less compressed composite to minimize glass crack out potential. According to one example, the downstream rolls of the present invention have an infiltrated outer peripheral surface with a Shore D hardness greater than about 45 and the non-infiltrated portion has a Shore D hardness of less than about 41. According to another example, the downstream rolls have a spring constant of less than about 4450 N/m.

The downstream rolls of the present invention can be infiltrated by ceramic particles selected from the group consisting of $SiO_2$, $ZrO_2$ and $Al_2O_3$ or their precursors thereof. The presence of the infiltrated particles can provide relatively harder downstream rolls while maintaining an easily compliable surface. Example source ceramic precursors include both a ceramic solid and an inorganic binder. For instance, source ceramic precursors include aqueous emulsions of silicone polymers, aqueous solutions of zirconium acetate, and aqueous dispersions of colloidal alumina. As one skilled in the art will understand, a variety of other source ceramic precursors can be used, including but not limited to soluble nitrates (alumina, magnesium, chromium, zirconium, etc.); isopropoxides of silicon, aluminum, zirconium, titanium or other alkoxides; soluble phosphate salts; oxy-chlorides; and sulfates; among others. Mixtures of ceramic precursors may also be used. Where the carrier is in liquid form, water, alcohols or hydrocarbon solvents may be suitable carrier fluids to form solutions, suspensions or emulsions of ceramic source precursors to use to infiltrate the millboard of the invention. Chemical vapor deposition or infiltration using low or high-pressure gasses as the precursor may also be used to infiltrate the millboard of the invention. The choice of ceramic precursor can be chosen to match the glass composition and/or to meet the application requirements.

Wherein the source ceramic precursor is a liquid mixture, concentration adjustments can be made to enhance or slow infiltration rates and/or depths. In one example, the source ceramic precursor comprises a liquid mixture, including a concentration of about 5% to about 50% of solid ceramic material. Concentrations outside of the example range may also be used.

Exemplary properties of standard rolls compared to the downstream rolls of the present invention can be described in Table 1, which illustrates that the surface properties as measured by the 30 deg conical Shore D indenter and the 0.5" ball Brinell indenter are considerably lower than the standard highly compressed roll, and therefore, would be expected to wear at a higher rate than the standard 1.09 g/cc roll. The low density rolls, however, would be expected to impart a significantly lower contact stress on the glass sheet owing to the much lower spring constant and/or higher compliance of the less compressed rolls. Upon infiltration with the preferred ceramic source precursors and compression to a lower compressed density of less than about 0.97 g/cc, the coefficient of friction is unaffected by the infiltration, but the hardness of the roll is brought in line with standard rolls. Additionally, the penetration resistance is reduced by up to 50%, but the spring constant of the low-density roll remains significantly lower than the standard harder roll. Therefore, the infiltrated rolls are expected to perform similarly to standard rolls in terms of their wear and pull force capabilities, but better than the standard rolls in terms of crack out potential.

TABLE 1

Average surface properties of standard rolls, low density rolls, and low density infiltrated rolls

| | Standard density roll, density = 1.09 g/cc | Low density roll #1 | Roll #1 with silicone infiltration of $SiO_2$ | Low density roll #2 | Roll #2 with zirconium acetate infiltration of $ZrO_2$ | Low density roll #3 | Roll #3 with alumina infiltration of $Al_2O_3$ |
|---|---|---|---|---|---|---|---|
| Grams (cc) oxide infiltrant | 0 (0) | 0 (0) | 0.28 g (0.13 cc) $SiO_2$ | 0 (0) | 0.72 g (0.12 cc) $ZrO_2$ | 0 (0) | 0.69 g (0.17 cc) $Al_2O_3$ |
| Modified Brinell hardness (kg/mm$^2$) | 1.5 | 1.04 | 1.14 | 1.05 | 1.17 | 0.96 | 1.04 |
| Shore D hardness | 46.6 | 38.2 | 46.2 | 40.6 | 47.3 | 37.5 | 49.2 |
| Spring Constant (lbf/mm) | 1206 | 657 | 764 | 670 | 895 | 564 | 621 |
| Coeff. of Friction (630 C.) | 0.39 | | 0.33 | | 0.39 | | 0.42 |

Figure 5:
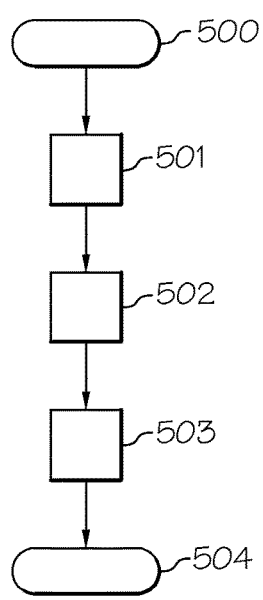
FIG. 5 is a flow chart demonstrating example steps of manufacturing glass ribbon in accordance with aspects of the disclosure.

FIG. 5 illustrates a method for manufacturing glass ribbon that can initiate with step 500. The method can then proceed to the step 501 of providing a forming apparatus including a forming member and at least one downstream roll, said downstream roll comprising at least one millboard piece, wherein at least a portion of an outer peripheral surface of the downstream roll comprises infiltrated ceramic particles, and wherein the infiltrated ceramic particles are infiltrated to a depth of about 1 mm to about 10 mm. The method can then proceed to step 502 of forming the glass ribbon 103 with the forming member 105. The method can then further proceed to the step 503 of engaging a first edge portion 113a of the glass ribbon 103 with the at least one downstream roll 131a to obtain a glass ribbon 103. The method can then end with step 504.

Figure 6:
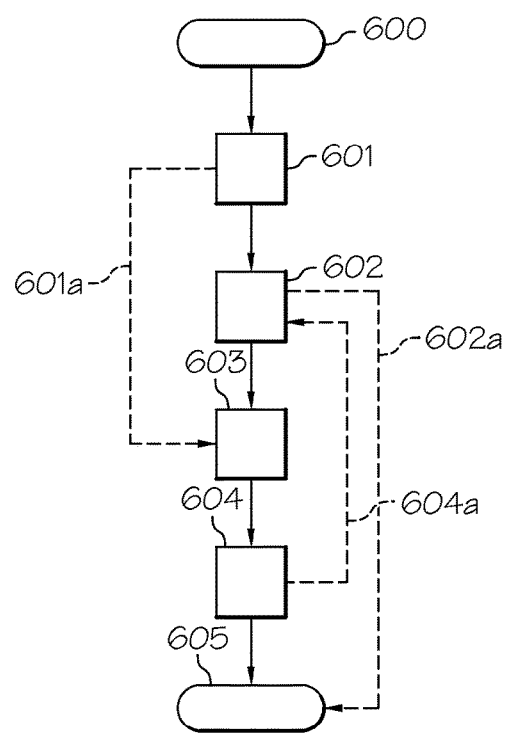
FIG. 6 is a flow chart demonstrating example steps of manufacturing a downstream roll in accordance with aspects of the disclosure.

FIG. 6 illustrates alternative methods and processes for forming or manufacturing a downstream roll. The methods can all begin with step 600 and proceed to step 601 of providing at least one millboard piece. The method can then optionally proceed to step 602 of compressing the at least one millboard piece to form at least one uninfiltrated roll. The method can then proceed to step 603 of contacting an outer peripheral surface of the at least one uninfiltrated roll with a source ceramic precursor such that the outer peripheral surface is infiltrated with ceramic particles to a depth of about 1 mm to about 10 mm. The method may then proceed to step 604 of drying the at least one infiltrated roll to obtain a downstream roll 131a, 131b. The method can then conclude with step 605.

As illustrated by arrow 601a, after the step 601 of providing the at least one millboard piece, the method may optionally proceed to the step 603 of contacting the outer peripheral surface of the at least one millboard piece with the source of ceramic precursor. As such, step 603 may occur before the step 602 of compressing. Next, the method may proceed to step 604 of drying and then, as indicated by arrow 604a, may proceed to the step 602 of compressing. As shown, by arrow 602a, the method may then be completed as indicated at 605.

As one skilled will recognize, the drying step 604 can occur either at ambient or at elevated temperatures, for any length of time sufficient to completely dry the at least one millboard piece.

Optionally, the method 600 for manufacturing a downstream roll can include a calcination step, whereby any non-ceramic components are removed.

In either embodiment of the method for manufacturing a downstream roll, the downstream roll can be assembled and then machined to a desired roll profile either before or after infiltration. In alternative examples, the millboard pieces may initially be machined and then assembled to a desired roll profile—wherein the initial machining may be carried out before or after infiltration.

In some examples, when the infiltration is performed prior to the assembly of the downstream roll, the infiltration can be performed on the fired disc or on the unfired (green) disc. In one example, the infiltration is performed on the green disc, since the ceramic source precursor will not alter the pore distribution of the original millboard disc.

The infiltration process can be performed using various transfer methods. In one aspect, contacting the outer peripheral surface of the at least one millboard piece with a ceramic precursor employs a dip bath including the ceramic source precursor. The dip bath process, whereby a source precursor is applied to the at least one millboard piece, can involve spinning the roll while partially immersing the roll in a solution of solids. In another aspect, contacting the outer peripheral surface of the at least one millboard piece with a ceramic source precursor employs a roll-to-roll transfer. In some examples, roll-to-roll transfer techniques can closely control the infiltration area and penetration depth of the source ceramic precursor. In further examples, the liquid infiltrant could be sprayed to the desired penetration depth of the at least one millboard piece. Likewise, the at least one millboard piece could be run under a curtain of re-circulating precursor. Likewise, the at least one millboard piece could be immersed in a tank of ceramic source precursor for a specified time.

It will be apparent to those skilled in the art that various modifications and variations can be made without departing from the spirit and scope of the claimed invention.

EXAMPLE 1

Alumina sol is a well dispersed nanoparticle ($Al_2O_3 \cdot nH_2O$) solution. It can produce micro-active alumina grains which have a high surface energy and chemical activity. It easily reacts with correlative constituents to form new compounds when dehydrated. Therefore, alumina sol is commonly used as an inorganic binder, especially under high temperature conditions.

AL20 is an alumina sol with 20% solids. Prior to infiltration, the alumina sol was diluted by half with water to obtain a solution content of 10% solids. The previously assembled downstream roll was immersed in the alumina sol solution with a depth of 1 mm to 10 mm. It was continuously rolled until the peripheral outer surface of the millboard was saturated with alumina sol for about 1-5 minutes. After infiltration, the roll was dried at room temperature for at least overnight. Alternatively, the infiltrated roll can be heat treated at a temperatures ranging from about 500° C. to about 800° C. to stabilize the bonding of the inorganic binder.

EXAMPLE 2

The infiltration can also be performed prior to roll assembly using either fired or unfired (green) millboard discs. The green discs were emerged in a solution of silicone, or a silicone emulsion, or a silica slurry for 2-3 minutes until saturated. The wetted discs were dried at room temperature and the fired at temperatures of 500-800° C. After firing, the inorganic binder more effectively bonds the loose particles. The fired discs were then assembled and compressed into a downstream roll.

EXAMPLE 3

A zirconium acetate solution was applied to an assembled downstream roll by slowly spinning the roll (i.e., at 6 rpm) while the roll is partially immersed in a reservoir of 10 wt % solids zirconium acetate solution at room temperature for 2 minutes.

What is claimed is:

1. A method for manufacturing a glass ribbon, the method comprising the steps of:
   (I) forming a glass ribbon; and
   (II) engaging a first edge portion of the glass ribbon with at least one roll; wherein the roll comprises:
   a non-infiltrated portion comprising millboard, the millboard having a compressed density between 0.85 g/cc and 0.97 g/cc; and
   an outer peripheral portion comprising millboard infiltrated with ceramic particles, the outer peripheral portion having a depth between about 1 mm and about 10 mm;
   wherein the ceramic particles are selected from the group consisting of $SiO_2$, $Al_2O_3$, $ZrO_2$, and mixtures thereof,
   wherein the roll comprises between about 1 wt % and about 5 wt % of ceramic particles, wherein a shore D hardness of the non-infiltrated portion is less than 41 and a shore D hardness of the outer peripheral portion is greater than 45, and wherein the roll has a spring constant of less than about 4550 N/mm.

2. The method of claim 1, wherein the step of forming the glass ribbon comprises introducing molten glass into a forming apparatus comprising an upper trough portion and a lower wedge portion.

3. The method of claim 2, wherein the step of forming the glass ribbon further comprises fusion down-drawing the glass ribbon from the forming apparatus.

4. The method of claim 2, wherein the roll is positioned downstream from the forming apparatus.

5. The method of claim 2, wherein step (II) includes driving the at least one roll to pull the edge portion of the glass ribbon from the forming apparatus.

6. The method of claim 1, wherein the roll comprises a plurality of millboard discs or a monolithic millboard roll.

7. The method of claim 1, further comprising engaging a second edge portion of the glass ribbon with an additional roll comprising a non-infiltrated portion comprising millboard and an outer peripheral portion comprising millboard infiltrated with ceramic particles to a depth between about 1 mm and about 10 mm.

* * * * *